No. 862,080. PATENTED JULY 30, 1907.
N. D. LEVIN.
ELECTRIC HAULAGE SYSTEM.
APPLICATION FILED NOV. 7, 1904.
4 SHEETS—SHEET 2.
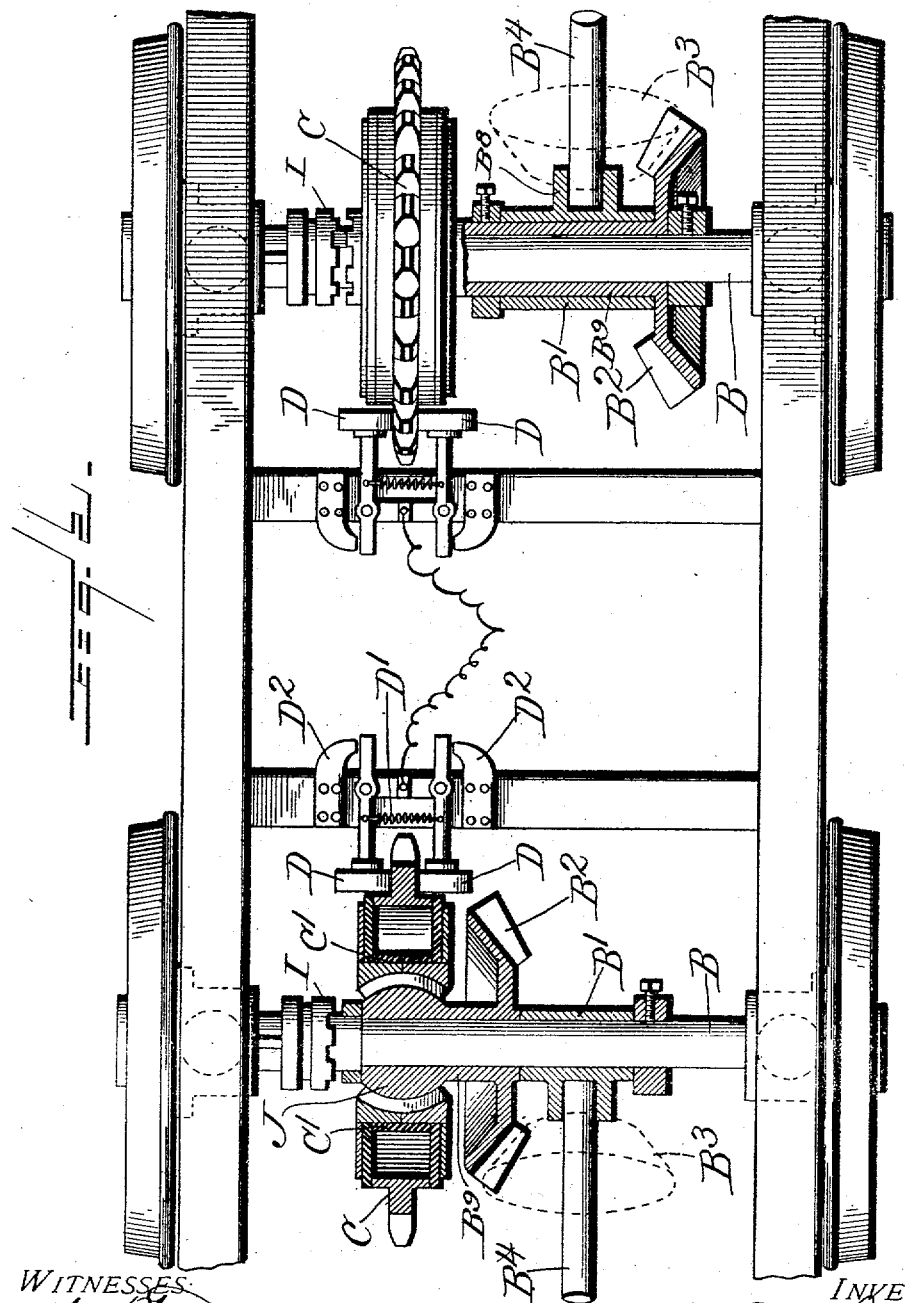

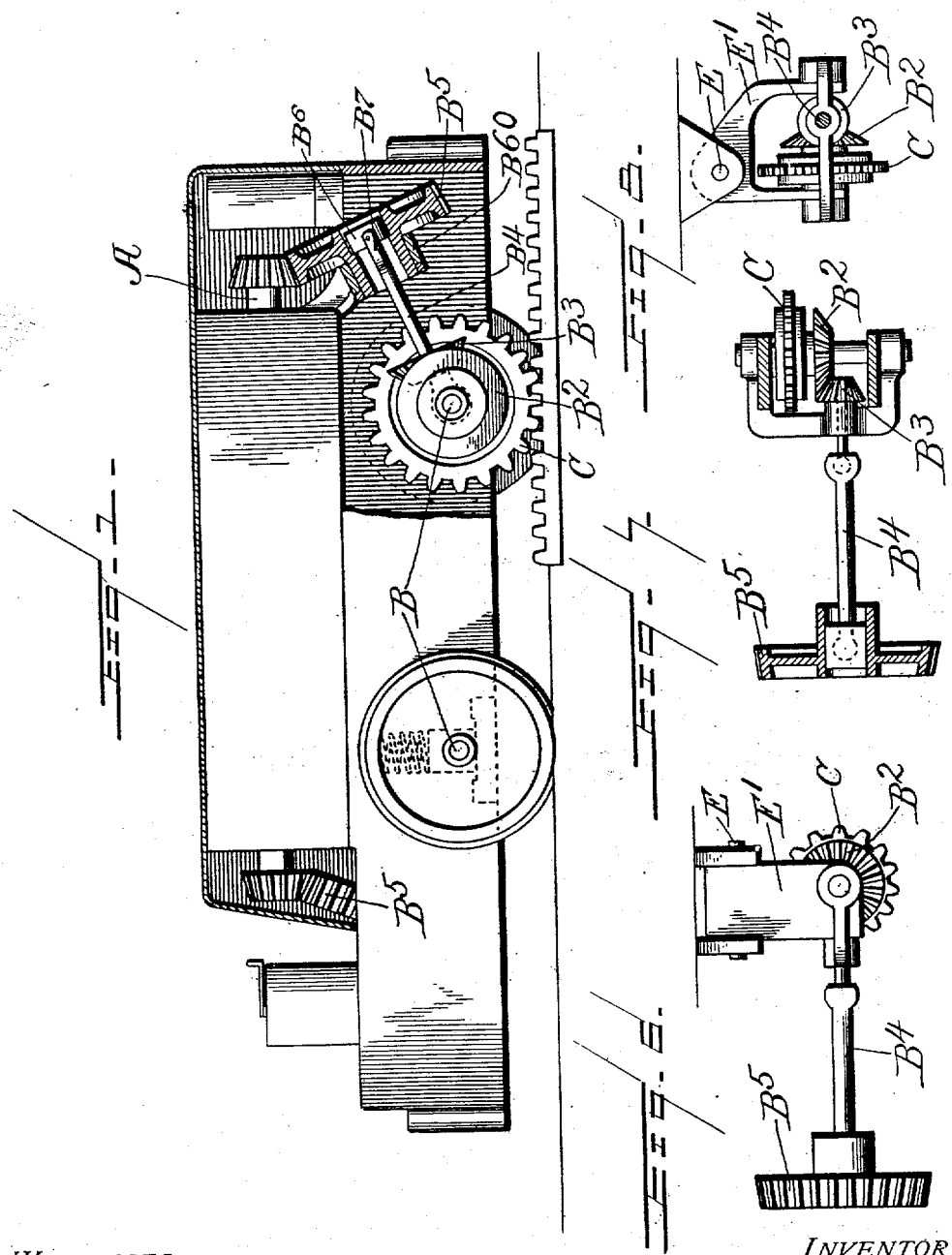

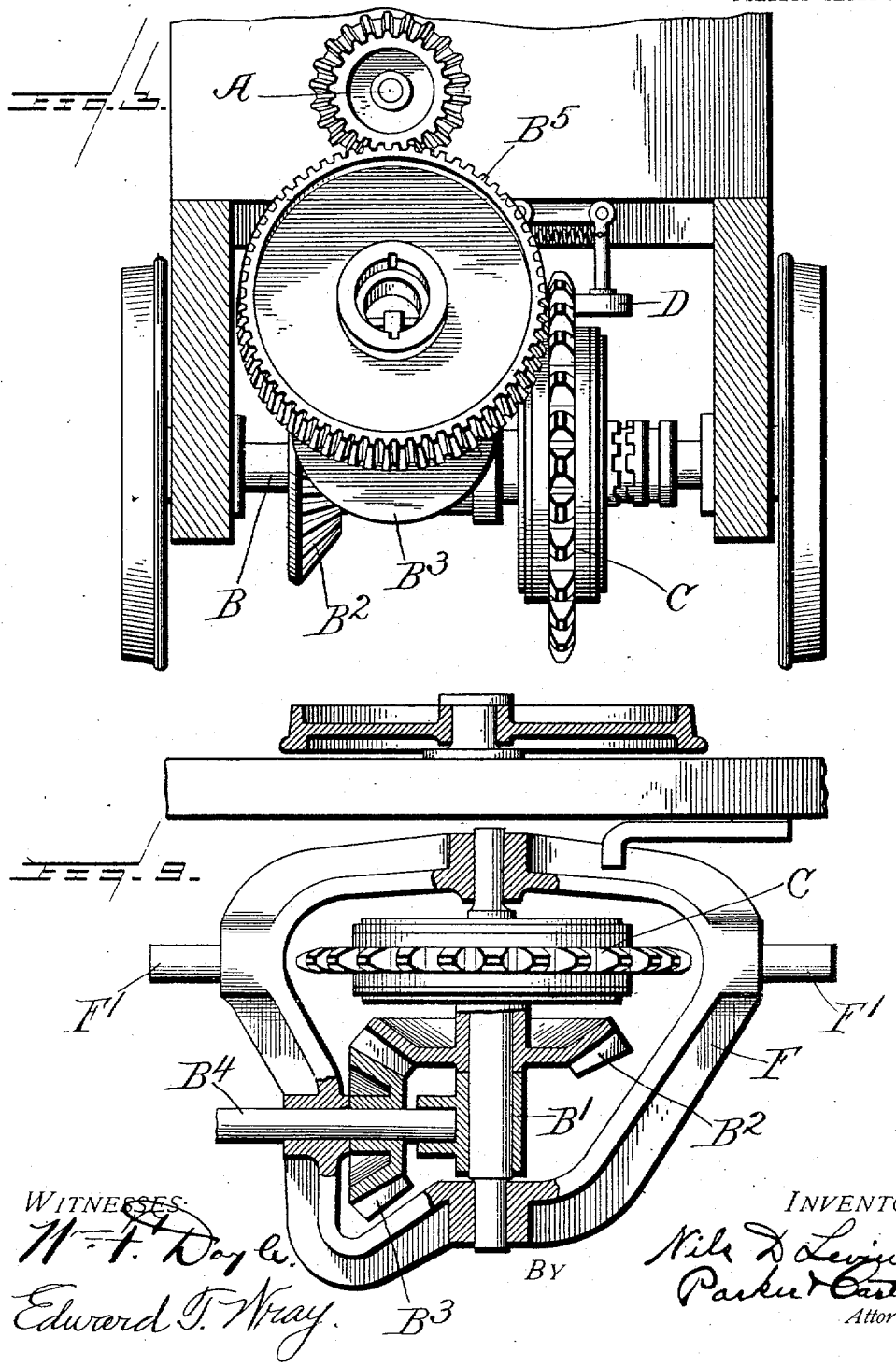

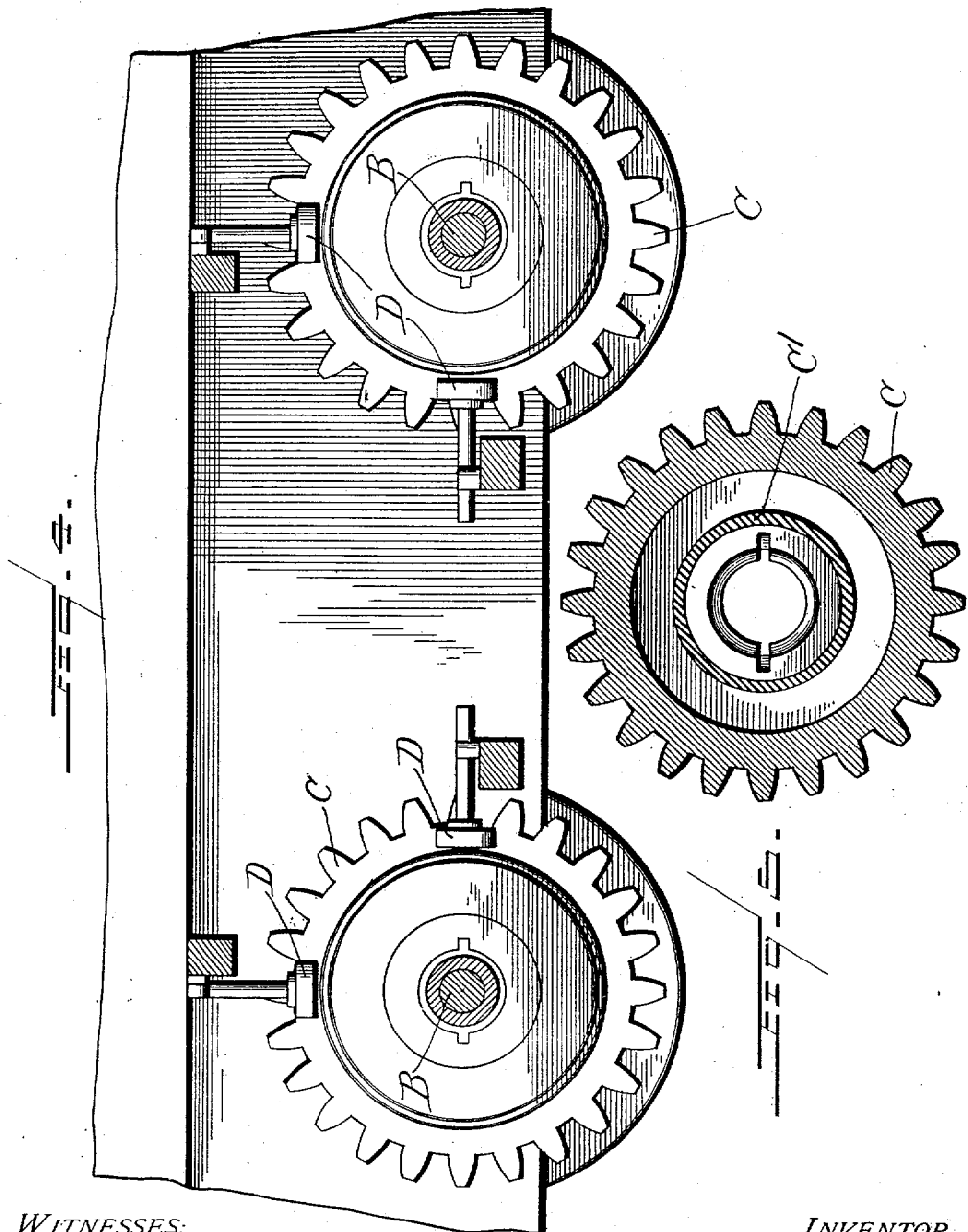

UNITED STATES PATENT OFFICE.

NILS D. LEVIN, OF CHICAGO, ILLINOIS, ASSIGNOR TO GOODMAN MANUFACTURING COMPANY, OF CHICAGO, ILLINOIS, A CORPORATION OF ILLINOIS.

ELECTRIC HAULAGE SYSTEM.

No. 862,080.  Specification of Letters Patent.  Patented July 30, 1907.

Application filed November 7, 1904. Serial No. 231,676.

*To all whom it may concern:*

Be it known that I, NILS D. LEVIN, a citizen of the United States, residing at Chicago, in the county of Cook and State of Illinois, have invented a certain new and useful Improvement in Electric Haulage Systems, of which the following is a specification.

The invention relates to rack rail locomotives, having for its object the providing of devices accommodating and allowing for inaccuracies between the alinement of the rails of the road-bed and the rack, which, while running parallel thereto, yet is subject to certain inaccuracies, for instance such as are due to careless workmanship, etc., it being desirable to have the propelling gear or sprocket upon the car yielding with reference to the car and so arranged as to be free to adjust itself to the differences in alinement of the rack, without compelling a corresponding movement of the entire truck and car. To accomplish this in the present instance, the sprocket itself is rendered free and independent of the car or attached masses or parts thereof, by being in some way movable, swiveling or tilting with reference thereto.

Figure 1 is a side elevation, partially in section, of a car embodying the present invention in one of its forms; Fig. 2 is a plan view, partially in section, of a portion of the same car, showing among other details the centrally swiveling sprocket or propelling gear; Fig. 3 is an end elevation of the gearing in Fig. 1; Fig. 4 is a diagrammatic view of a portion of Fig. 1 illustrating the plurality of guiding devices for each swiveling gear; Fig. 5 is a detail of the gear; Figs. 6, 7, 8 and 9 are alternate forms of tilting or swiveling gears, in the first three the gear hanging like a pendulum from a pivot above and the last showing a divided pivot down more nearly in the axle plane of the gear.

The motor shaft A is connected to the axle by some suitable intermediate gear. As illustrated in Figs. 1 and 2, for example, the car axle B is provided with a perforated shaft or axle such as the sleeve $B^9$ through which the axle passes and carrying a bevel gear $B^2$, which is engaged by the bevel-gear $B^3$ connected with the inclined or oblique shaft $B^4$ having one end mounted in a bearing $B^8$ on a sleeve B surrounding the axle. As shown in Fig. 2 the sleeve $B^1$ on the front axle surrounds the sleeve $B^9$ carrying the gear $B^2$ while on the rear axle the sleeve $B^1$ is directly mounted upon the axle at the end of sleeve $B^9$. This shaft $B^4$ is connected with the gear $B^5$ in any suitable manner. As shown for example in Fig. 1, this shaft receives support at its upper end through a universal joint of any of the well known constructions, in the present instance simply consisting of the double right angle knuckle, one part $B^6$ engaging the gear and the other part $B^7$ connected with the shaft, the gear having a large hub for this purpose and the part $B^6$ contained within the hub and being made loose longitudinally within the hub, so as to perform the function of a slip-joint, relieving thereby the necessity of the exact maintenance of centers or distances between the axle center and the plane of the oblique gear driven by the motor shaft. The gear $B^5$ is mounted in a suitable support $B^{60}$ and engages a gear on the motor shaft A.

Connected with the sleeve $B^9$ is a driving or propelling gear C engaging the rack K, see Fig. 1 and this gear or sprocket is so mounted as to be movable so as to yield or move free of the car to accomodate itself to the inequalities of the rack as the car moves therealong that is, so as to form a swiveling propelling gear. As shown in Figs. 1 and 2, this driving gear or sprocket is swiveled onto the sleeve $B^9$ said sleeve having a ball J which fits into the hub of the gear C. This gear is provided with resilient means for guiding it. As shown in Figs. 1 and 2, for example, this resilient means consists of opposed engaging devices D, which are elastically pressed together in any desired manner, as by means of the spring $D^1$. The movement of these parts is limited by the stops $D^2$. A number of these guiding devices may be used to engage the gear at different points at angles to each other, as shown in Fig. 4.

The driving gear C, in Figs. 2, 3, 4, 5 and 9, are shown as being insulated the rim from the hub, by the insulation $C^1$ shown clearly in Figs. 2 and 5. This is for the purpose of adapting the present construction to the class of third and rack-rails, where the rack is employed as the electric conductor between the source of electrical supply and the motor. In this instance, the guide or device for guiding the swiveling propelling gear may be used for the conductor, as is illustrated in Fig. 2 the current being taken off by the engaging devices D.

In the arrangement shown in Figs. 1 and 2, for example, the tilting action of the gear takes place about the center of the gear. This tilting action may be secured by other arrangements, such for example as shown in Figs. 6, 7, 8 and 9. In Figs. 6, 7 and 8, the gear is swiveled about a pivot E connected with the body of the car or locomotive, or some other part associated therewith, said gear being mounted in the swiveled bracket $E^1$, as illustrated in Figs. 6 and 8. In this construction, the gear $B^2$ is connected with the shaft carrying the gear C and is engaged by the gear $B^3$ connected to the driving shaft $B^4$ and gear $B^5$, which connects with the armature shaft. It will be seen that by this arrangement the driving gear or sprocket C is free to tilt or move or oscillate with relation to the car and without moving the body of the car, and thus an automatic adjustment is made for inequalities and misalinements of the rack.

In Fig. 9, the driving gear or sprocket C is mounted upon a shaft carried by a frame F, which is pivotally suspended from the body of the car, as by being mounted upon the projecting shafts or axles F¹ journaled in bearings on the body of the car. In this case, the gear oscillates or swivels about centers in a lower plane than when constructed as shown in Figs. 6, 7 and 8. In every instance, however, it is desirable that this swiveling or tilting action takes place preferably about a center which is coincident or practically coincident with the plane of the gear. A clutch device is shown between the sprocket and the car axle, so that the sprocket may be connected with or disengaged from the car axle at will and which acts as a torque transmitting connection between the gear and the car wheel. The sleeve B⁹ is free from the car wheel normally and is connected thereto by the clutch device I. It will thus be seen that I have here an arrangement by means of which the driving sprocket may follow the inequalities of the rack rail, without communicating the eccentric or undesirable motion to the body of the locomotive or car.

I have described in detail particular constructions embodying my invention, but it is of course evident that the parts may be varied in many particulars and some of the parts omitted and others used with parts not herein shown, without departing from the spirit of my invention, and I therefore do not limit myself to the constructions shown.

I claim:

1. In a rack-rail haulage system, a rack parallel with the road-bed, and a swiveling propelling gear on the car engaging the rack.

2. In a rack-rail haulage system, a rack parallel with the road-bed, a swiveling propelling gear on the car engaging the rack, and means for guiding the gear.

3. In a rack-rail haulage system, a rack parallel with the road-bed, a swiveling propelling gear on the car engaging the rack, and a plurality of means for guiding the gear.

4. In a rack-rail haulage system, a rack parallel with the road-bed, a swiveling propelling gear on the car engaging the rack, and a plurality of means for guiding the gear so disposed as to engage the gear at angles to each other.

5. In a rack-rail haulage system, a rack parallel with the road-bed, a swiveling propelling gear on the car engaging the rack, and resilient means for guiding the gear.

6. In an electric rack-rail haulage system, an insulated rack parallel with the road-bed, and a swiveling insulated propelling gear on the car engaging the rack.

7. In a rack-rail haulage system, a rack parallel with the road-bed, a movable propelling gear on the car engaging the rack, and a centralized spring-impelled guide for the gear.

8. In a rack-rail haulage system, a rack parallel with the road-bed, a swiveling propelling gear on the car engaging the rack, and a plurality of centralized spring guides for the gear.

9. In a rack-rail haulage system, a rack parallel with the road-bed, and a swiveling gear mounted on the car axle engaging the rack.

10. In a rack-rail haulage system, a rack parallel with the road-bed, a car wheel and axle, a sleeve or axle free from a car wheel, and a swiveling propelling gear mounted on the sleeve or axle.

11. In a rack-rail haulage system, a rack parallel with the road-bed, a car wheel and axle, a sleeve or axle free from a car wheel, a swiveling propelling gear mounted on the sleeve or axle, and a torque transmitting connection to the car wheel.

12. In a rack-rail haulage system, a rack parallel with the road-bed, a tilting propelling gear swinging on a center in or approximately in the plane of the gear, the said gear engaging the rack.

13. In a rack-rail haulage system, a rack parallel with the road-bed, a car wheel and axle, a sleeve or axle free from a car wheel, a swiveling propelling gear mounted on the sleeve or axle, and a driving connection to the sleeve or axle.

14. In a rack-rail haulage system, a rack parallel with the road-bed, a car wheel and axle, a sleeve or axle free from a car wheel, a swiveling propelling gear mounted on the sleeve or axle, and a yielding driving connection to the sleeve or axle.

15. In a rack-rail haulage system, a rack parallel with the road-bed, a sleeve on the car axle, a swiveling propelling gear on the sleeve, and a power connection between the gear and the axle.

16. In a rack-rail haulage system, a rack parallel with the road-bed, a car supporting a motor, a swiveling propelling gear on the car engaging the rack, and a power connection between the motor and the swiveling gear.

17. In a rack-rail haulage system, a rack parallel with the road-bed, a car, wheels and axles for the car, springs between the car and the axles, a motor on the car, a swiveling propelling gear on the car engaging the rack, and a yielding power connection between the motor and the swiveling gear.

18. In a rack-rail haulage system, a rack parallel with the road-bed, a car, a shaft or axle upon the car, a ball upon the shaft, and a swiveling propelling gear mounted upon the ball engaging the rack.

19. In a rack-rail haulage system, a rack parallel with the road-bed, a car, a shaft or axle upon the car, a ball upon the shaft, a swiveling propelling gear mounted upon the ball engaging the rack, and a torque driving connection between the ball shaft and the gear.

20. In a rack-rail haulage system, a rack parallel with the road-bed, a car, a shaft or axle upon the car, a ball upon the shaft, a swiveling propelling gear mounted upon the ball engaging the rack, and a second gear secure to the ball shaft.

21. In a rack-rail haulage system, a rack parallel with the road-bed, a car, a shaft or axle upon the car, a ball upon the shaft, a swiveling propelling gear mounted upon the ball engaging the rack, a second gear secure to the ball shaft, and a power driving connection to the said separate gear.

22. In a rack-rail haulage system, a rack parallel with the road-bed, a car, a perforated shaft or axle upon the car, a ball upon the shaft, and a swiveling propelling gear mounted upon the ball engaging the rack.

23. In a rack-rail haulage system, a rack parallel with the road-bed, a car, a perforated shaft or axle upon the car, and a car axle extending through the perforation, a ball upon the shaft, and a swiveling propelling gear mounted upon the ball engaging the rack.

24. In a rack-rail haulage system, a rack parallel with the road-bed, a car, a perforated shaft or axle upon the car, a shaft extending through the perforation, a detachable power connection between the perforated shaft and the interior shaft, a ball upon the shaft, and a swiveling propelling gear mounted upon the ball engaging the rack.

25. In a rack-rail haulage system, a rack parallel with the road-bed, a swiveling propelling gear engaging the rack, a shaft for such gear, a bevel-gear upon such shaft, and a coöperating bevel-gear or pinion engaging therewith for driving a propelling gear.

26. In a rack-rail haulage system, a rack parallel with the road-bed, a swiveling propelling gear engaging the rack, a shaft for such gear, a bevel-gear upon such shaft, a coöperating bevel-gear or pinion engaging therewith for driving the propelling gear, and means for supporting the shaft of the driving gear or pinion.

27. In a rack-rail haulage system, a rack parallel with the road-bed, a swiveling propelling gear engaging the rack, a shaft for such gear, a bevel-gear upon such shaft, a coöperating bevel-gear or pinion engaging therewith for driving the propelling gear, and a universal joint for the shaft of the bevel-gear or pinion.

28. In a rack-rail haulage system, a rack parallel with the road-bed, a swiveling propelling gear engaging the rack, a shaft for such gear, a bevel-gear upon such shaft, a coöperating bevel-gear or pinion engaging therewith for driving the propelling gear, and a slip-joint for the shaft of the bevel-gear or pinion.

29. In a rack-rail haulage system, a rack parallel with the road-bed, a swiveling propelling gear engaging the rack, a shaft for such gear, a bevel-gear upon such shaft, a coöperating bevel-gear or pinion engaging therewith for driving the propelling gear, and a combined slip and universal joint for the shaft of the bevel-gear or pinion.

30. In a rack-rail haulage system, a rack parallel with the road-bed, a propelling gear upon the car engaging the rack, a motor upon the car, and a power connection from the motor to the propelling gear, including a bevel-gear and universal joint.

31. In a rack-rail haulage system, a rack parallel with the road-bed, a propelling gear upon the car engaging the rack, a motor upon the car, and a power connection from the motor to the propelling gear, including a bevel-gear, universal joint and slip joint.

32. In a rack-rail haulage system, a rack parallel with the road-bed, a propelling gear on the car engaging the rack, a motor with horizontal shaft upon the car, and a power transmission between the motor and said propelling gear, including two pairs of bevel-gears.

33. In a rack-rail haulage system, a rack parallel with the road-bed, a propelling gear on the car engaging the rack, a motor with horizontal shaft upon the car, and a power transmission between the motor and propelling gear, including two pairs of bevel-gears and an oblique or inclined shaft.

34. In a rack-rail haulage system, a rack parallel with the road-bed, a propelling gear on the car engaging the rack, a motor upon the car, and a power transmission between the motor and propelling gear, including two pairs of bevel-gears and an oblique or inclined shaft, the said shaft provided with a universal joint.

35. In a rack-rail haulage system, a rack parallel with the road-bed, a plurality of propelling gears on the car engaging the rack, a motor with horizontal shaft upon the car, and a power transmission between the motor and each propelling gear, each power transmission including two pairs of bevel-gears.

36. In a rack-rail haulage system, a rack parallel with the road-bed, a plurality of propelling gears on the car engaging the rack, a motor with horizontal shaft upon the car, and a power transmission between the motor and each propelling gear, each power transmission including two pairs of bevel-gears, one of such transmissions connected with each end of the motor shaft.

NILS D. LEVIN.

Witnesses:
HERBERT E. GOODMAN,
HOMER L. KRAFT.